United States Patent

[11] 3,570,641

[72] Inventors Alain P. Lefeuvre, Lez Dijon France;
Loren G. Sadler, Stevens, Pa.
[21] Appl. No. 855,076
[22] Filed Aug. 27, 1969
[45] Patented Mar. 16, 1971
[73] Assignee Sperry Rand Corporation
New Holland, Pa.

[54] LOCKING AND POSITIONING MECHANISM FOR SELECTIVELY SETTING A DISCHARGE SPOUT OF A HARVESTER
7 Claims, 5 Drawing Figs.

[52] U.S. Cl. .................................................. 193/4,
56/16, 193/22, 214/42, 285/320, 302/34, 302/61
[51] Int. Cl. .................................................. B65g 53/40
[50] Field of Search .................................................. 193/15, 22,
4, 5; 302/17, 34, 61; 214/42; 285/184, 320; 56/16, 24

[56] References Cited
UNITED STATES PATENTS
623,109 4/1899 Schuman .................. 302/34
780,832 1/1905 Storer ........................ 222/193
3,251,631 5/1966 Hennen ..................... 302/34
3,516,713 6/1970 Wagstaff ................... 302/61

Primary Examiner—Evon C. Blunk
Assistant Examiner—W. Scott Carson
Attorneys—Joseph A. Brown, John C. Thompson, James J. Kennedy and George C. Bower ABSTRACT: A locking and positioning mechanism has a lower radially extending annular flange on the lower vertical stationary discharge conduit of a forage harvester and an upper radially extending angular flange on a discharge spout telescopically and rotatably mounted on the lower discharge conduit and extending outwardly further than the lower flange. A strap rotatably fits around the spout immediately above the upper flange and pivotally supports a generally radially extending yoke with a long handle for freely moving the strap around the spout. The handle is attached to the yoke to pivot vertically and has a downwardly extending latch. The latch fits in circumferentially spaced notches in the upper flange to rotate the spout and on further lowering of the handle the latch fits into one of a larger number of circumferentially spaced notches in the second flange over an arc corresponding to the space between the upper notches to lock the spout in a selected fixed position for directing chopped crops from the forage harvester in the selected direction.

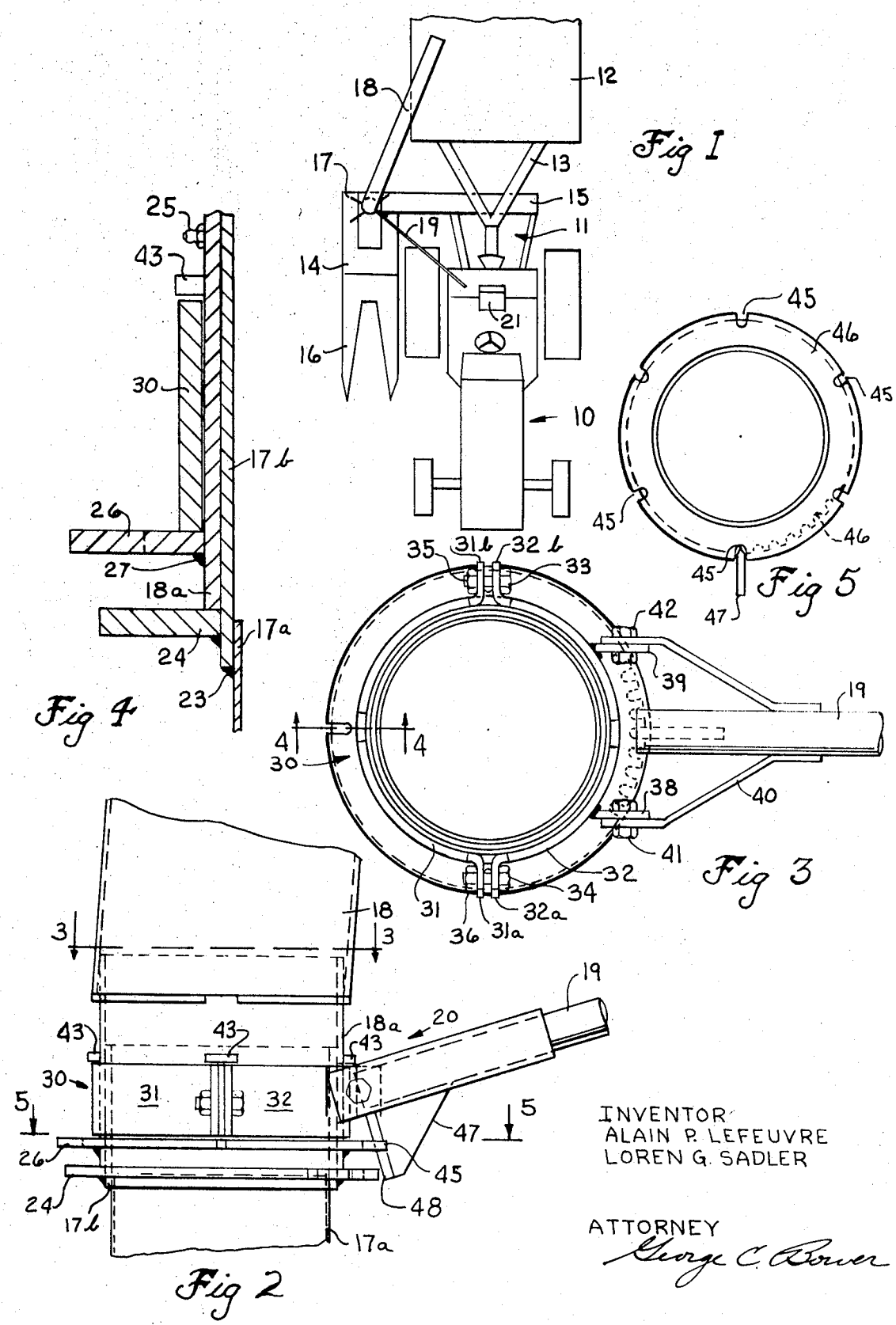

LOCKING AND POSITIONING MECHANISM FOR SELECTIVELY SETTING A DISCHARGE SPOUT OF A HARVESTER

BACKGROUND OF THE INVENTION

This invention relates to means for rotating the discharge spout on a harvester through all quadrants and setting the spout at a selected position.

In some agricultural areas forage harvesters that are mounted on the three-point hitch of a tractor and extend along the side of a tractor are popular particularly in view of their low cost. The forage wagon may be drawn by the tractor or may be separately drawn to the side of the tractor. The discharge spout of the forage harvester extends towards and over into the wagon. It is desirable to vary the position of the discharge spout during harvesting so as to distribute the chopped crops more evenly throughout the wagon. It is also desirable to be able to maintain the spout directed toward the wagon on turning corners. When the wagon is at the side of the tractor its position may vary requiring prompt readjustment. In addition to the ease of adjustment it is also desirable to position the discharge at any location such as forwardly for transport or rearwardly or sidewardly for discharge.

Various devices are utilized to adjust and hold the position of the spout. Most of these are operated by a crank or handle extending to the tractor seat for convenient control by the operator. However, most of these devices are unacceptable as being too expensive for the relatively inexpensive forage harvester or are too difficult to operate so their proper direction of the crops is not fully attained. One method is to frictionally hold the discharge spout on the discharge conduit from the forage harvester. This has the disadvantage that, if the discharge spout is going to hold its proper position in moving across the field, the friction grip will be large and difficult to overcome by the tractor operator. Thus he finds it difficult to readily change the position of the spout or to locate it precisely. A more satisfactory form of changing and holding the position of the discharge spout is by a worm and gear. This is easy to operate and permits a precise adjustment of the discharge spout to the particular position selected by the tractor operator. However, these mechanisms even in the more inexpensive forms are still too costly. Further, the discharge spout cannot be moved as rapidly as desired under certain conditions of operation. Of course, a very satisfactory method is to use a hydraulic jack. This attains a rapid and easy and precise adjustment of the discharge spout but has the disadvantage of being too expensive for a simple forage harvester.

It is, therefore, desirable that a positioning mechanism be developed that permits a rapid movement of the discharge spout, a precise positioning of the spout at the desired setting and is inexpensive to manufacture and install.

OBJECTS AND SUMMARY OF THE INVENTION

An object of this invention is to provide a forage harvester discharge spout locking and positioning means that is easy to operate and can be readily set at any desired position.

Another object of the invention is to provide a locking and positioning mechanism for discharge spout of the forage harvester that is easily adjustable and inexpensive.

Another object of the invention is to provide a locking and positioning mechanism for a forage harvester discharge spout that permits independent movement of the control means from the discharge spout and easy movement to a discharge spout actuating position and to a locking position for holding the discharge spout at a desired setting.

In summary this locking and positioning means for a discharge spout comprises relatively movable flanges mounted on the discharge spout and discharge conduit, respectively, with means for engaging the discharge spout flange to move the discharge spout to a desired position and further moving to engage the discharge conduit flange for holding the discharge spout at the selected position.

Other and further objects and advantages of the invention will be apparent from the following specification and claims taken in connection with the drawings.

BRIEF DESCRIPTION OF THE DRAWINGS

FIG. 1 is a top view of a tractor drawing a forage wagon with a forage harvester positioned at the side of the tractor mounted on the three-point hitch.

FIG. 2 is an enlarged side view of the locking positioning mechanism for setting and holding the discharge spout at a selected position.

FIG. 3 is a top view of the locking and positioning means taken along lines 3—3 of FIG. 2 with the discharge spout removed.

FIG. 4 is a fragmentary sectional view of the locking and positioning coupling taken along lines 4—4 of FIG. 3.

FIG. 5 is another embodiment illustrated cross-sectionally taken along a plane similar to the section taken along lines 5—5 of FIG. 2.

DETAILED DESCRIPTION OF THE PREFERRED EMBODIMENT

Referring to FIG. 1 a tractor 10 is shown with a three-point hitch 11. A forage wagon 12 has the hitch 13 connected to the tractor for being drawn behind the tractor. A single row forage harvester 14 is mounted on a three-point of the tractor by the support 15 and extends forwardly along the right side of the tractor with crop gathering means 16 extending forwardly to harvest a single row of standing crops such as corn. The harvested crop is passed through the forage harvester 14 and chopped into small pieces and discharged through a discharge conduit 17 affixed to the forage harvester. A discharge spout 18 is rotatably mounted on the discharge conduit 17 for directing the chopped crops into the forage wagon 12. A handle 19 connected to the locking and positioning coupling mechanism 20 extends adjacent to the tractor seat 21.

The discharge conduit 17 has a generally rectangular shape at the base and narrows upwardly into a conical discharge end 17a. A cylindrical extension 17b (FIGS. 2 and 4) is fitted over the outside of the cylindrical 17a and welded thereto at 23. A lower flange 24 extends circumferentially completely around the cylindrical extension 17b and extends radially outwardly therefrom. The discharge spout 18 also has a cylindrical extension 18a fitting inside of the spout 18. The spout extension 18a fits over the extension 17b with the inner surface of the extension 18a in engagement with the outer surface of the extension 17b. Lubricant may be provided by fitting 25 and the extension 18a for easy relative rotation of the two extensions. An upper flange 26 spaced from the lower flange 24 is welded to the spout extension 18a at 27. Thus the flange 26 is relatively movable in relation to the flange 24.

Around the extension 17b and 18a and above the flange 26 is strap means 30 formed by two semicircular straps 31,32 with radially projecting ends 31a,32a and 31b,32b facing one another, respectively, with bolts 33,34 extending thereto fastened by nuts 35,36. The nuts and bolts are tightened so that the strap portion 31,32 snugly but freely rotate about the extension 18a.

On strap portion 32 lugs 38,39 are welded to strap 32 and extend parallel to one another for pivotal attachment of the yoke 40 by the fastening means 41,42. The yoke is fixedly secured to the handle 19 so that the handle can pivot in relation to the strap means 30 and the flanges 24 and 26. The handle 19 can also rotate the strap means 30 about the extension 18a. Projections 43 extend radially and are welded to the extension 18a for holding the strap means 30 longitudinally in position on the extension 18a.

The upper flange 26 has four radially extending notches or catches 45. The flange 24 has a plurality of closely spaced notches or catches 46 on the edge of the flange 24 facing towards the tractor seat 21. The flanges 24 and 26 with their respective notches may be considered as catch means.

The handle 19 extends inwardly from the attachment to the yoke 40 and has a triangular shaped latch 47 which extends vertically and radially to the flanges. As best seen in FIGS. 2 and 4 the upper flange 26 extends radially outwardly further than the lower flange 24. On downward rotation of the handle 19 the latch 47 has an edge 48 which may fit into a slot 45 or be positioned clear of the periphery of flange 26. With the handle 19 at a slight angle the latch 47 will be in the notch 45 and still be clear of any of the notches 46 on the flange 24. In this position the handle 19 can rotate spout 18 to any desired position. When this position is reached, the handle 19 can be further lowered so that the edge 48 of the latch 47 fits into one of the notches 46. This locks the spout 18 in fixed relation with the discharge conduit 17. The slots 46 are close together and if the latch 47 does not mate with one of the slots 46 a slight rotational movement will bring it into registry with a slot 46 without departing materially from the selected position of the spout 18. In the embodiment of FIGS. 3 and 4 the upper flange has four notches with the notches 46 extending over a quadrant. In FIG. 5 six notches 45 are provided in the flange and the series of notches 46 extend over a 60° arc. Further, the spout may be moved to any position by disengaging the latch 47 from a notch 46 and the spout 18 moved. When the handle is at the furthest reach of the operator the latch 47 may be disengaged from the notch 45 and the handle swing back and the latch 47 dropped into the following notch 45 and the repositioning of the spout continued to the desired location and the latch fitted into a notch 46.

It is thus seen from the foregoing description that the tractor operator may easily and readily move the discharge spout 18 and set it to any desired position. This is done by lifting the arm 19 so that latch 47 moves out of registry with a notch 46 in the lower flange 24 and move the spout. Thus as the tractor turns a corner the operator may move the spout to follow the deflection between the wagon and the tractor and continue the loading of the material into the wagon. As the tractor and wagon move across the field the spout can be shifted to better distribute the crop material over the wagon by merely lifting the arm slightly out of registry with a notch 46 and shift the spout and drop the handle 19 so that the latch 47 moves into another notch 46.

The locking and positioning mechanism comprises the two flanges 24 and 26, the strap means 30, the yoke 40 and the handle 19. It is readily seen that these are inexpensive parts that may be readily and easily attached to the discharge conduit and discharge spout with standard manufacturing procedures. Yet, the mechanism provides very easy and precise adjustment of the discharge spout by the tractor operator.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall with in the scope of the invention or the limits of the appended claims.

We claim:

1. On a crop discharge assembly having a discharge conduit and a discharge spout rotatably mounted thereon; a locking and positioning mechanism comprising strap means rotatably mounted on said assembly with a handle pivotally mounted thereon and extending outwardly from said assembly a set of catch means spaced around said spout, a set of catch means on said discharge conduit and closely spaced together within the spacing between two of said spout catch means, and latch means on said handle and on a pivoting of said handle engageable with both sets of catch means for locking said spout at a given position, engageable only with said spout catch means to rotate said spout on said discharge conduit and disengageable from both of said sets of catch means for free rotation of said strap and handle about said assembly.

2. On a crop discharge assembly as set forth in claim 1 wherein said sets of catch means are horizontal and strap means is rotatably mounted on said discharge spout above both of said sets of catch means and said latch means extends downwardly for engagement with said sets of catch means.

3. On a crop discharge assembly as set forth in claim 2, wherein said set of spout catch means extend outwardly further than said set of conduit catch means to permit said latch means to be in engagement with said spout catch means while out of engagement with said conduit catch means.

4. A crop discharge assembly as set forth in claim 1 wherein said sets of catch means on said discharge spout and said discharge conduit are radially extending flanges with radially extending peripheral notches and said notches on said discharge spout extend radially outwardly further than said notches on said discharge conduit.

5. A crop discharge assembly as set forth in claim 4 wherein said strap is above said flanges and said latch means extends downwardly.

6. A locking and positioning mechanism for setting a discharge spout rotatably mounted on the discharge conduit of a harvester comprising a plurality of catches positioned circumferentially around and fixedly attached to said spout and being spaced over substantial arc, a plurality of catches on said conduit and fixedly attached thereto and spaced closely together over an arc corresponding to the arc between said spout catches, a strap freely rotatable around said spout above said spout catches, a handle pivotally attached to said strap, a latch on said handle extending downwardly in overlapping relation with said spout and conduit catches and engageable with both of said catches to lock said spout in a given— position and engageable only with said spout catches to rotate said spout on said conduit and disengageable from both of said catches for free rotation of said handle about said spout.

7. A locking and positioning mechanism for setting a discharge spout rotatably mounted on the discharge conduit on a forage harvester comprising a lower radially extending flange securely fixed to said discharge conduit adjacent said rotatably discharge spout, an upper radially extending flange securely fixed to said discharge spout adjacent to said discharge conduit and above said lower flange, a strap around said spout above said upper radially extending flange and freely rotatably on said spout, a handle extending radially from said strap with means for pivotally mounting said handle on said strap, a latch on said handle extending downwardly from said handle in overlapping relation with said flanges, said flanges having peripheral notches for receiving said latch with said upper flange extending radially outward further than said lower flange with said notches spaced over long arcs for receiving said latch for rotation of said discharge spout and said lower flange having a plurality of notches over a short arc of the order of the spacing between said spout notches for receiving said latch at a select position and locking said discharge spout rotationally in respect to said discharge conduit for discharge of chopped crops in the desired direction.